United States Patent [19]
Fillion et al.

[11] Patent Number: 5,730,041
[45] Date of Patent: Mar. 24, 1998

[54] HYDROSTATIC ASSEMBLY WITH CONTROLLED SPIN

[75] Inventors: Pierre Fillion, Pontpoint; Bernard Nicolas, Armancourt, both of France

[73] Assignee: Poclain Hydraulics, France

[21] Appl. No.: 672,441

[22] Filed: Jun. 28, 1996

[30] Foreign Application Priority Data

Jun. 30, 1995 [FR] France ................... 95 07901

[51] Int. Cl.$^6$ ........................................ F01B 1/06
[52] U.S. Cl. ........................ 91/492; 91/498; 91/519; 180/197
[58] Field of Search ................... 60/484, 485, 494; 91/492, 498, 519; 180/197

[56] References Cited

U.S. PATENT DOCUMENTS

| | | | |
|---|---|---|---|
| 3,972,186 | 8/1976 | Humphreys et al. | 91/498 |
| 4,773,219 | 9/1988 | Bagwell | 60/484 |
| 4,807,519 | 2/1989 | Wusthof et al. | 180/197 |
| 5,201,570 | 4/1993 | Heren et al. | 91/492 |
| 5,473,894 | 12/1995 | Bigo et al. | 91/492 |

FOREIGN PATENT DOCUMENTS

| | | |
|---|---|---|
| 0176427 | 4/1986 | European Pat. Off. |
| 0505254 | 9/1992 | European Pat. Off. |
| 0547947 | 6/1993 | European Pat. Off. |
| 2163136 | 7/1973 | France |
| 2706539 | 12/1994 | France |

*Primary Examiner*—F. Daniel Lopez
*Attorney, Agent, or Firm*—Ladas & Parry

[57] ABSTRACT

A hydrostatic bridge including two hydraulic motors each having two distinct operating cylinder capacities, both motors sharing an overall casing. The bridge has four main ducts of a first type (feed or exhaust) and two main ducts of a second type (exhaust or feed). The overall casing has three upstream ducts respectively connected to the first and second main ducts of the first type themselves connected to distribution ducts of the first motor, to third and fourth main ducts of the first type, themselves connected to distribution ducts of the second motor, and to first and second main ducts of the second type, themselves connected to distribution ducts of both motors. The bridge includes an anti-spin device capable of selectively reducing the flow rate in the first upstream duct and in the second upstream duct for selectively correcting spin of the first and second motors.

11 Claims, 5 Drawing Sheets

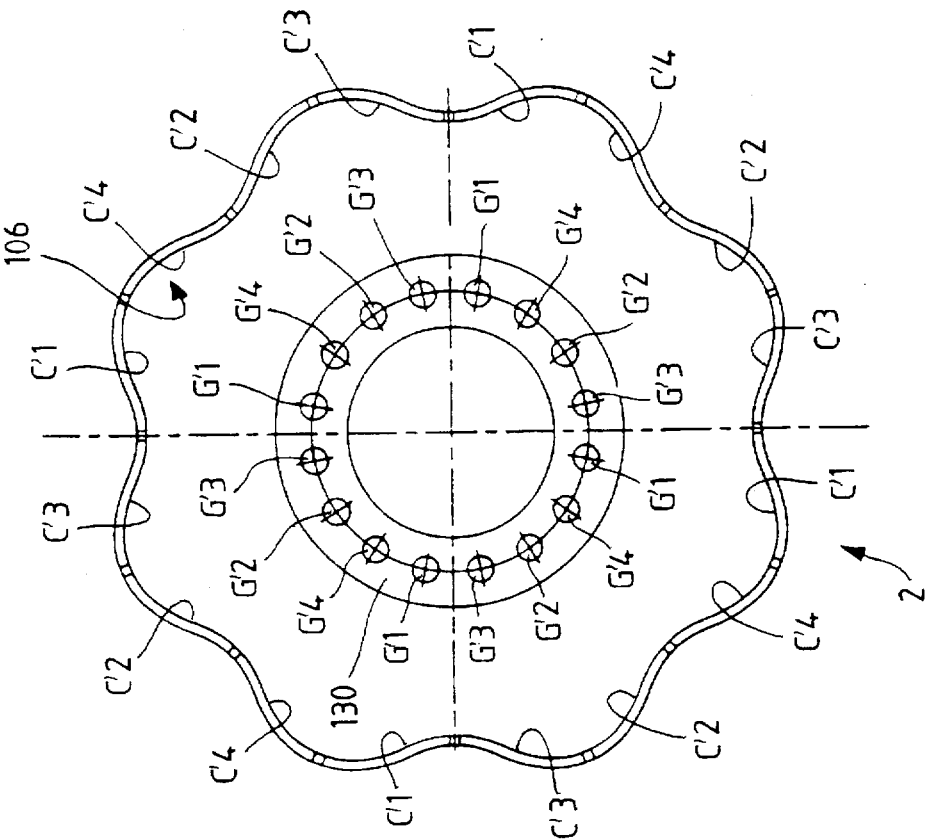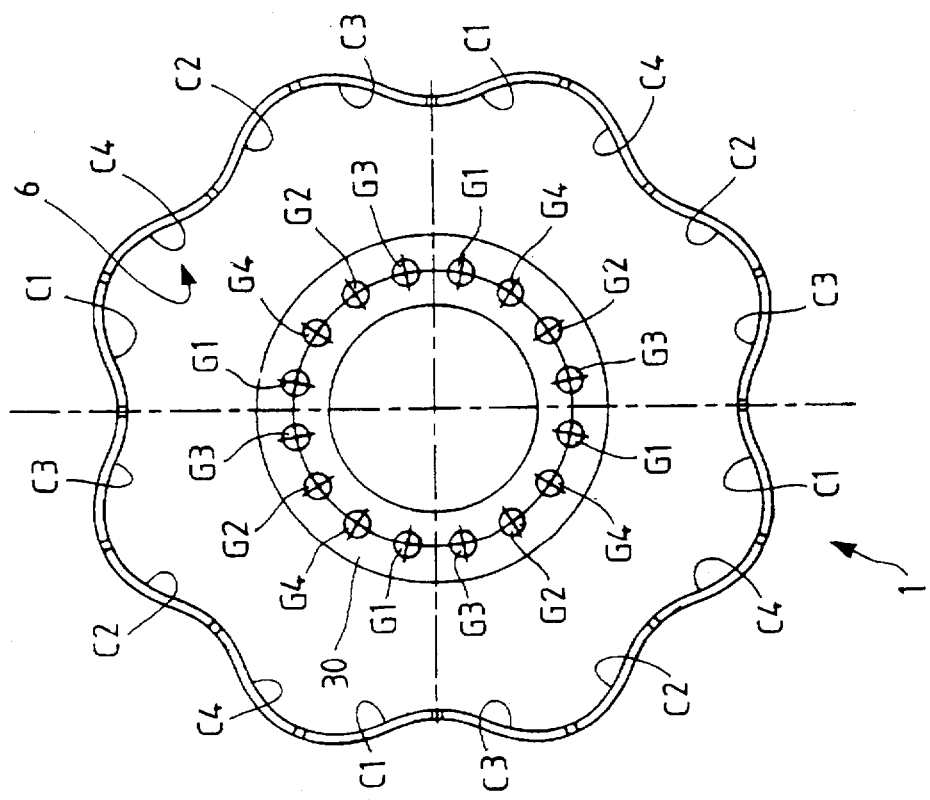

HYDROSTATIC ASSEMBLY WITH CONTROLLED SPIN

The present invention relates to a hydrostatic bridge comprising an overall casing, two hydraulic motors having two distinct operating cylinder capacities, and a device for simultaneously selecting the cylinder capacities of said motors.

Each of the motors comprises:

a cylinder block which is mounted to rotate about an axis of rotation relative to a reaction member secured to the overall casing against rotation about said axis, and including a plurality of radial cylinders suitable for being fed with fluid under pressure, the cylinder block being provided with a communication face perpendicular to the axis of rotation; and an internal fluid distributor secured to the overall casing against rotation and having a distribution face perpendicular to the axis of rotation, and a connection face, said distributor including distribution ducts which open out into said distribution face to be put into communication with the cylinders, said distribution face being suitable for being pressed against the communication face of the cylinder block.

The axis of rotation is common to the two motors.

The connection faces of the distributors of the two motors are situated facing each other, and the distribution faces of said distributors are urged axially against the respective communication faces of the cylinder blocks of the two motors.

The motors include "main" ducts both of a first type and of a second type, said ducts being found in the overall casing, co-operating with the device for selecting the cylinder capacity of the motors, and being suitable for communicating with the distribution ducts. The main ducts of the first type belong to one of two groups constituted by cylinder feed ducts and ducts for exhausting fluid from the cylinders, and the main ducts of the second type belong to the other of said two groups.

Each motor comprises a shaft mounted to rotate relative to the casing about the axis of rotation and constrained to rotate with the cylinder block. The shafts of the two motors may drive vehicle displacement members.

BACKGROUND OF THE INVENTION

A hydrostatic bridge of that type is known from the French patent application filed in the name of the Applicants on Jun. 14, 1993, and published under the number 2 706 539.

Such a bridge is particularly compact since the two motors are closely tied to one another, having a casing which is common to both of them and the connection faces of the distributors being situated directly facing each other.

More precisely, according to that document, the distributors of the two motors are completely connected hydraulically by their connection faces such that the distribution ducts corresponding to the two motors are permanently connected to one another. Thus, the two motors operate in parallel and are completely synchronous.

In that known device, it is not possible to control the flow rate and/or the pressure of the fluid in one of the motors independently of the other.

Also known, from the European patent filed by the Applicants on Mar. 16, 1992 and published under the number 0 505 254, is an anti-spin system fitted to the pressurized fluid motors of a vehicle. A system of that type reduces the fluid flow rate in one of the motors as soon as it is observed that the speed of rotation of said motor is becoming excessive. Clearly, that system will operate only if the fluid flow rates through the different motors can be adjusted independently.

OBJECTS AND SUMMARY OF THE INVENTION

The present invention seeks to improve that device known from French patent application No. 2 706 539 in order to enable the fluid flow rate through each of the two motors of the bridge to be controlled independently, regardless of the operating cylinder capacity in use, and to provide the bridge with an anti-spin system.

This object is achieved by the facts that:

the bridge includes four main ducts of the first type and two main ducts of the second type:

the first and second main ducts of the first type being connected via respective first and second grooves to respective first and second groups of distribution ducts of the first motor;

the third and fourth main ducts of the first type being connected via respective third and fourth grooves to respective first and second groups of distribution ducts of the second motor;

the first main duct of the second type being connected via a fifth groove to a third group of distribution ducts of the first motor and to a third group of distribution ducts of the second motor, the ducts of the third group of distribution ducts of the first and second motors being hydraulically connected via the connection faces of the distributors of said motors; and the second main duct of the second type being connected via a sixth groove to a fourth group of distribution ducts of the first motor and to a fourth group of distribution ducts of the second motor, the ducts of the fourth groups of distribution ducts of the first and second motors being hydraulically connected via the connection faces of the distributors of said motors; and the overall casing includes first, second, and third upstream ducts suitable for being connected to a main fluid source via a fluid circuit, the cylinder capacity selection device having a "large cylinder capacity" first position in which the first, second, and third upstream ducts are connected respectively to the first and second main ducts of the first type, to the third and fourth main ducts of the first type, and to the first and second main ducts of the second type, and a "small cylinder capacity" second position in which the first, second, and third upstream ducts are connected respectively to the first main duct of the first type, to the third main duct of the first type, and to the first main duct of the second type, the second and fourth main ducts of the second type communicating, in said second position, with each other and with the second main duct of the second type; and the bridge includes an anti-spin device which comprises means for measuring the speed of rotation of each motor and for transmitting correction signals as soon as the speed of rotation of one of the motors becomes excessive, a first anti-spin valve suitable for reducing the fluid flow rate in the first upstream duct as a function of the correction signal relating to the first motor, and a second anti-spin valve suitable for reducing the fluid flow rate in the second upstream duct as a function of a correction signal relating to the second motor.

By means of these dispositions, the fluid flow rates in the motors can be controlled separately in the main ducts of the first type. Each motor includes two main ducts of the first type which are specific thereto, flow rate can be controlled in both ducts for large cylinder capacity operation, and in only one of the ducts for small cylinder capacity operation. By hydraulically connecting the distribution ducts respectively connected to the first and to the second main ducts of the second type via the connection faces of the distributors, it is possible to preserve the compactness of the assembly and to restrict the number of branches and junctions.

In a particularly advantageous variant, a hydrostatic bridge of the invention is fitted in an assembly which further includes a third hydraulic motor comprising:

a casing;

a cylinder block which is mounted to rotate about an axis of rotation relative to a reaction member secured to the casing with respect to rotation about said axis, and which includes a plurality of radial cylinders suitable for being fed with fluid under pressure;

an internal fluid distributor secured to the casing with respect to rotation and having a distribution face, said distributor including distribution ducts that open out into said distribution face to be put into communication with the cylinders; and at least one duct for feeding the cylinders with fluid and at least one duct for exhausting fluid from the cylinders, said ducts being suitable for communicating with the distribution ducts.

The first and second upstream ducts together, and the third upstream duct on its own, are respectively suitable for being put into communication with one and the other of said feed and exhaust ducts.

The third motor includes an anti-spin device which comprises means for measuring the speed of rotation of the third motor and for transmitting a correction signal as soon as said speed becomes excessive, and a third anti-spin valve suitable for reducing the fluid flow rate in one of the fluid feed and exhaust ducts of the third motor as a function of said correction signal.

The third motor includes a shaft constrained to rotate with the cylinder block and presents one or two outlets for entraining one or more vehicle displacement members.

BRIEF DESCRIPTION OF THE DRAWINGS

The invention will be well understood and its advantages will appear more clearly on reading the following detailed description of an embodiment given by way of non-limiting example.

The description refers to the accompanying drawings, in which:

FIGS. 3A and 3B are diagrammatic views of the cam surfaces and the distribution faces of the distributors of the two motors;

MORE DETAILED DESCRIPTION

Figure 1:
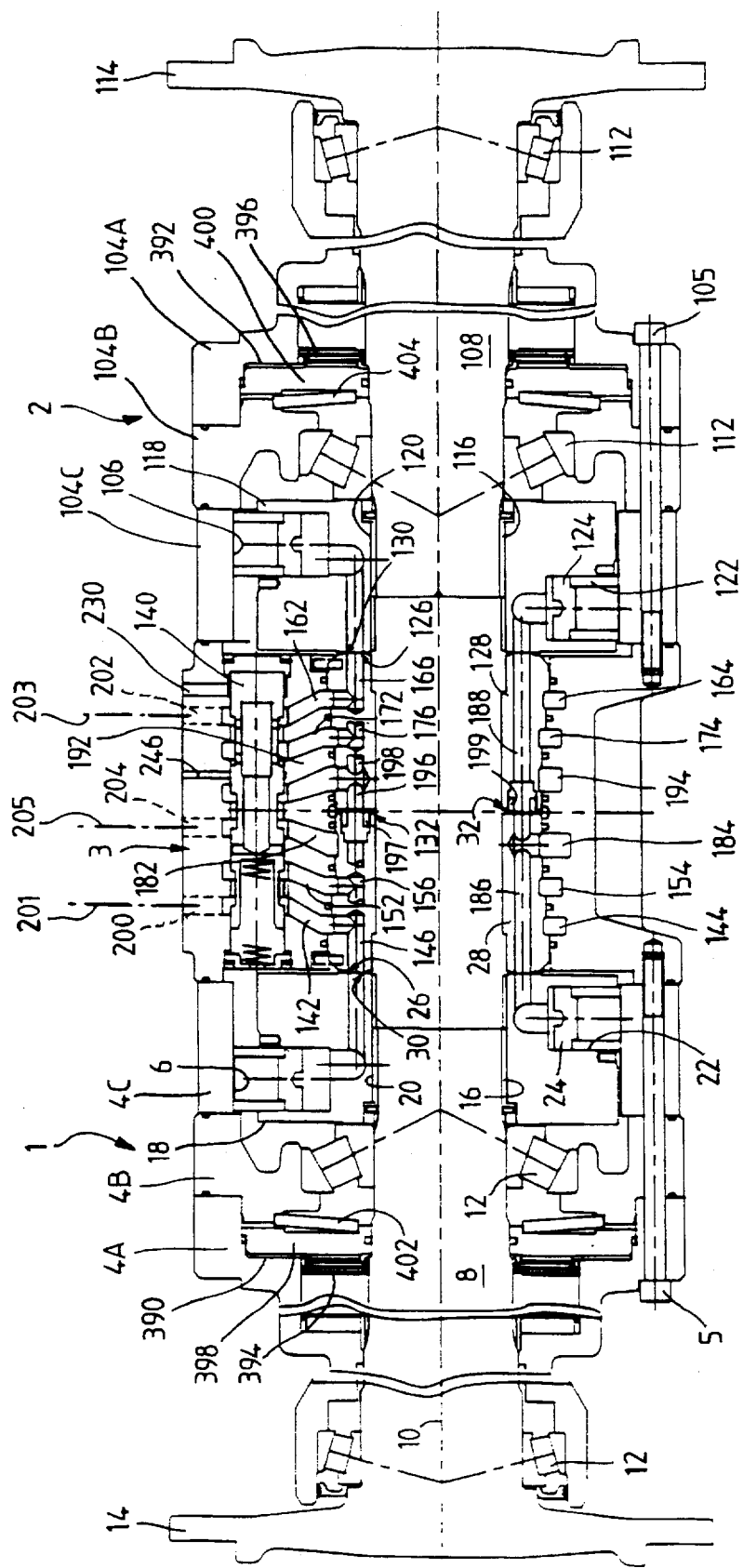
FIG. 1 is an axial section view showing the two motors of the hydrostatic bridge.

FIG. 1 shows the two hydrostatic motors 1 and 2 of the bridge having a portion of casing 3 in common.

The motor 1 comprises:

a casing comprising four portions 4A, 4B, 4C, and 3, where the portions are assembled together by screws 5;

an undulating reaction cam 6 constituted by the internal periphery of casing portion 4C;

a motor shaft 8 which is mounted to rotate relative to the casing about an axis of rotation 10 by means of roller bearings 12, which is provided with a coupling flange 14 suitable for coupling to a wheel, and which also has fluting 16;

a cylinder block 18 which includes a central bore provided with fluting 20 that co-operates with the fluting 16 to constrain the cylinder block and the shaft to rotate together about the axis 10, the cylinder block including a plurality of radial cylinders 22 suitable for being fed with fluid under pressure, each having a respective roller piston 24 slidably mounted therein, with the cylinder block as a whole having a communication face 26 perpendicular to the axis 10; and an internal fluid distributor 28 secured to the overall casing against rotation and having a distribution face 30 perpendicular to the axis of rotation, and a connection face 32, the distributor including distribution ducts which open out into the distribution face 30 to be put into communication with the cylinders 22, said distribution face being suitable for being pressed against the communication face 26 of the cylinder block.

The configuration of motor 2 is analogous to that of motor 1. For simplification purposes, component elements of motor 2 that are analogous to those described above for motor 1 are given the same references plus 100. It should be observed that the axis of rotation 10 is common to both motors and that the assembly constituted by casing portions 4A, 4B, 4C, 3, 104A, 104B, and 104C constitutes the overall casing of the bridge, with casing portion 3 being referred to below as the "common casing".

The connection faces 32 and 132 of the distributor 28 and 128 of the two motors are situated facing each other and are urged axially respectively against the respective communication faces 26 and 126 of the cylinder blocks 18 and 118 of the two motors.

The bridge includes a device 140 for simultaneous selection of the cylinder capacities of the motors.

The motors include "main" ducts of two different types which are to be found in the overall casing and more particularly in the common casing 3, which ducts co-operate with the cylinder capacity selection device 140 and are suitable for communicating with the distribution ducts of one or both of the motors. The main ducts of the first type belong to one of two groups constituted by ducts for feeding the cylinders and ducts for fluid exhaust from the cylinders, and the main ducts of the second type belong to the other of said two groups.

To simplify the description, it is assumed below that the main ducts of the first type are feed ducts while the main ducts of the second type are exhaust ducts. This convention must naturally be understood as not being restrictive, particularly since a feed duct can be become an exhaust duct, and vice versa, depending on the direction of rotation of the motor shaft.

The main ducts comprise:

a first main feed duct 142 connected via a first groove 144 to a first group of distribution ducts of the first motor, which first group includes the duct 146;

a second main feed duct 152 connected via a second groove 154 to a second group of distribution ducts of the first motor, which group includes the duct 156;

a third main feed group 162 connected via a third groove 164 to a first group of distribution ducts of the second motor, which group includes the duct 166;

a fourth main feed group 172 connected via a fourth groove 174 to a second group of distribution ducts of the second motor, which group includes the duct 176;

a first main exhaust duct 182 connected via a fifth groove 184 to a third group of distribution ducts of the first motor, which third group includes the duct 186, and to a third group of distribution ducts of the second motor, which third group includes the duct 188; and a second main exhaust duct 192 connected via a sixth groove 194 to a fourth group of distribution ducts of the first motor, which group includes the duct 196, and to a fourth group of distribution ducts of the second motor, which group includes the duct 198.

The ducts of the third groups of distribution ducts of the first and second motors are hydraulically connected via the connection faces 32 and 132 of the distributors 28 and 128 of the motors. The same applies to the ducts of the fourth groups of distribution ducts of the two motors. Connection studs 197 and 199 are used for hydraulically interconnecting paired distribution ducts.

It should be observed that it is particularly under the effect of the fluid pressure that obtains in the ducts of the third and fourth groups of distribution ducts of the two motors that the distribution faces are urged axially against the communication faces of the cylinder blocks. It should also be observed that although they are shown diagrammatically to facilitate understanding, all of the ducts are clearly not present in the same plane as the section, and indeed some of the distribution ducts are shown truncated in the figure.

The overall casing, or more precisely the common casing 3 includes three upstream ducts 200, 202 and 204 which are represented by dashed lines in FIG. 1. These are suitable for being connected to a main fluid source via a fluid circuit. Each of them is therefore connected to an external feed duct or to an external exhaust duct, said external ducts being represented by chain-dotted lines in FIG. 1 and given respective references 201, 203, and 205.

In a "large cylinder capacity" first disposition of the cylinder capacity selection device, as shown in FIG. 1, the first upstream duct 200 is connected to the first and second main feed ducts 142 and 152, the second upstream duct 202 is connected to the third and fourth main feed ducts 162 and 172, while the third upstream duct 204 is connected to the first and second main exhaust ducts 182 and 192.

In contrast, in a "small cylinder capacity" second position of the cylinder capacity selection device, the first upstream duct 200 is connected only to the first feed duct 142, the second upstream duct 202 is connected only to the third main feed duct 162, while the third upstream duct 204 is connected only to the first main exhaust duct 182. In this small cylinder capacity position, the second and fourth main feed ducts 152 and 172 communicate with one another and with the second main exhaust duct 192.

While the bridge is operating at large cylinder capacity, the main feed ducts 142 and 152 are fed via the first upstream duct 200, and the exhaust from the first motor takes place via both the first and the second main exhaust ducts 182 and 192 which are connected to the third upstream duct 204.

For the second motor, large cylinder capacity feed takes place simultaneous via the third and fourth main feed ducts 162 and 172 which are themselves fed by the second upstream duct 202, and exhaust takes place via both the first and second main exhaust ducts 182 and 192 which are connected to the third upstream duct 204.

In contrast, during small cylinder capacity operation, feed and exhaust for the first motor take place solely via the duct 142 and the duct 182 respectively, while feed and exhaust for the second motor take place solely via the ducts 162 and 182 respectively, the main ducts 152, 172, and 192 then being connected together and isolated from the upstream ducts 200, 202, and 204. In this way, only half of the distribution ducts of each motor are fed with fluid under pressure or are used for exhausting said fluid.

The cylinder capacity selection device is described below in greater detail with reference to FIG. 2. The common casing 3 includes a cylindrical axial bore 210. This bore has six annular grooves 212, 214, 216, 218, 220, and 222 into which the main ducts 142, 152, 182, 192, 172, and 162 open out respectively. The upstream ducts 200, 202, and 204 open out into the grooves 212, 222, and 216 respectively.

A slide 224 is slidably mounted in the bore 210. The slide is suitable for occupying two positions. The (large cylinder capacity) first position is shown in the top half of the bore 210, while the (small cylinder capacity) second position is shown in the bottom half of said bore. The slide is urged towards its first position by a return spring 226 placed at one of its ends. It is urged towards its second position under the effect of the fluid pressure that obtains in a chamber 228 formed at its other end, said chamber being fed with fluid under pressure via an auxiliary selection duct 230. When the fluid contained in the chamber 228 ceases to be under pressure, the action of the spring 226 overcomes that of the fluid.

The cylindrical slide 224 has three annular grooves 232, 234, and 236. When the slide is in its first position, the groove 232 puts the grooves 212 and 214 of the bore 210 into communication so that the first and second main feed ducts 142 and 152 are both fed by the first upstream duct 200. In the same position, the groove 234 puts the grooves 216 and 218 of the bore 210 into communication such that the first and second main exhaust ducts 182 and 192 are connected together, both enabling fluid to be exhausted via the third upstream duct 204. Still in the same position, the groove 236 interconnects the grooves 220 and 222, such that the third and fourth main feed ducts 162 and 172 are both fed from the second upstream duct 202.

In contrast, when the slide is in its second position, the groove 232 connects only the first main feed duct 142 to the first upstream duct 200, the third main feed duct 162 is fed only by the second upstream duct 202 which opens out directly into the groove 222, and the first main exhaust duct 182 is connected only to the third upstream duct 204, via the grooves 216 and 234.

A chamber 238 is formed inside the slide 224 which opens out to the periphery of said slide via a first channel 240 situated between the grooves 232 and 234, and which opens out into the groove 236 via two channels 242 and 244. Also, an auxiliary booster duct 246 is connected to the bore 210 between the grooves 218 and 220.

In the first position of the slide, the channel 240 faces the wall of the bore so that no fluid can leave, the channels 242 and 244 face the grooves 220 and 222, and the wall of the slide situated between the grooves 234 and 236 closes the duct 246 which therefore allows no fluid to pass through.

In contrast, in the second position of the slide, the channel 240 is connected to the second main feed duct 152, and the channels 242 and 244 are connected to the fourth main feed duct 172 and to the second main exhaust duct 192, while the duct 246 opens out into the cavity provided between the wall of the bore 210 and the groove 236 of the slide. Thus, the ducts 152, 172, and 192 can communicate with one another and with the chamber 238, and fluid can enter or leave via the duct 246 so as to establish constant pressure in the cylinders put into communication with the main ducts 152, 172, and 192 and thus enable the roller pistons to be kept bearing against the undulating reaction cam when the motors are operating under small cylinder capacity conditions.

FIGS. 3A and 3B make it easier to understand how the two motors of the bridge operate under large and small cylinder capacity conditions. They show diagrammatically the surfaces of the cams 6 and 106 of the motors 1 and 2, together with the distribution faces 30 and 130 of the distributor of said motors. In the example, each group of distribution ducts includes four distribution ducts. Insofar as each motor includes four groups of distribution ducts, the cam surface for each motor has sixteen half-lobes. To facilitate understanding, the ends of the distribution ducts of the first, second, third, and fourth groups of distribution ducts of the first motor are given references G1, G2, G3, and G4, respectively. Those half-lobes of the cam surfaces which, at a given instant, co-operate with the pistons situated in the cylinders connected to the ends of the above-defined distribution ducts are given the references C1, C2, C3, and C4, respectively. For the second motor, the references are the same together with a prime symbol '.

At any given instant when the bridge is operating at large cylinder capacity, the distribution ducts G1 and G2 of the first motor are fed simultaneously and urge the corresponding pistons against the half-lobes C1 and C2, while the distribution ducts G3 and G4 enable the fluid to escape and thus enable the corresponding pistons to be returned radially towards the axis of rotation of the motor under drive from cam half-lobes C3 and C4.

In the first motor, when the bridge is operating at small cylinder capacity, only the distribution ducts of group G1 are fed and only the distribution ducts of group G3 enable fluid to escape from the bridge. In contrast, the ducts of distribution groups G2 and G4 do not contribute to operation of the motor.

The second motor operates in analogous manner.

During large cylinder capacity operation, the ducts G1 and G2 of the first motor are independent of the ducts G'1 and G'2 of the second motor, while the ducts G3 and G4 of the first motor communicate with the ducts G'3 and G'4 of the second motor. Thus, an anti-spin system can operate on one of the motors independently of the other by acting for the first motor on the ducts G1 and G2, and for the second motor on the ducts G'1 and G'2.

If, using the above-selected convention, the main ducts of the first type are feed ducts, then motor spin is controlled by acting solely on the feed to one or the other of the motors, without acting on the exhaust. Nevertheless this should not be understood restrictively since, depending on the direction of rotation, the main ducts of the first type may be exhaust ducts, in which case it is possible to control motor spin by acting solely on the exhaust ducts.

When operating at small cylinder capacity, the ducts G1 of the first motor and G'1 of the second motor are independent, while the ducts G3 and G'3 are common. It is thus possible to control spin of one of the motors independently of the other by acting on fluid flow in the ducts G1 or in the ducts G'1.

The anti-spin device of the bridge comprises means for measuring the speed of rotation of the motors 1 and 2 and for transmitting correction signals as soon as the speed of rotation of one of the motors becomes excessive. It also comprises a first anti-spin valve suitable for reducing the fluid flow rate through the first upstream duct 200 as a function of a correction signal concerning the first motor 1, and a second anti-spin valve suitable for reducing the fluid flow rate through the second upstream duct 202 as a function of a correction signal relating to the second motor 2.

Figure 4:
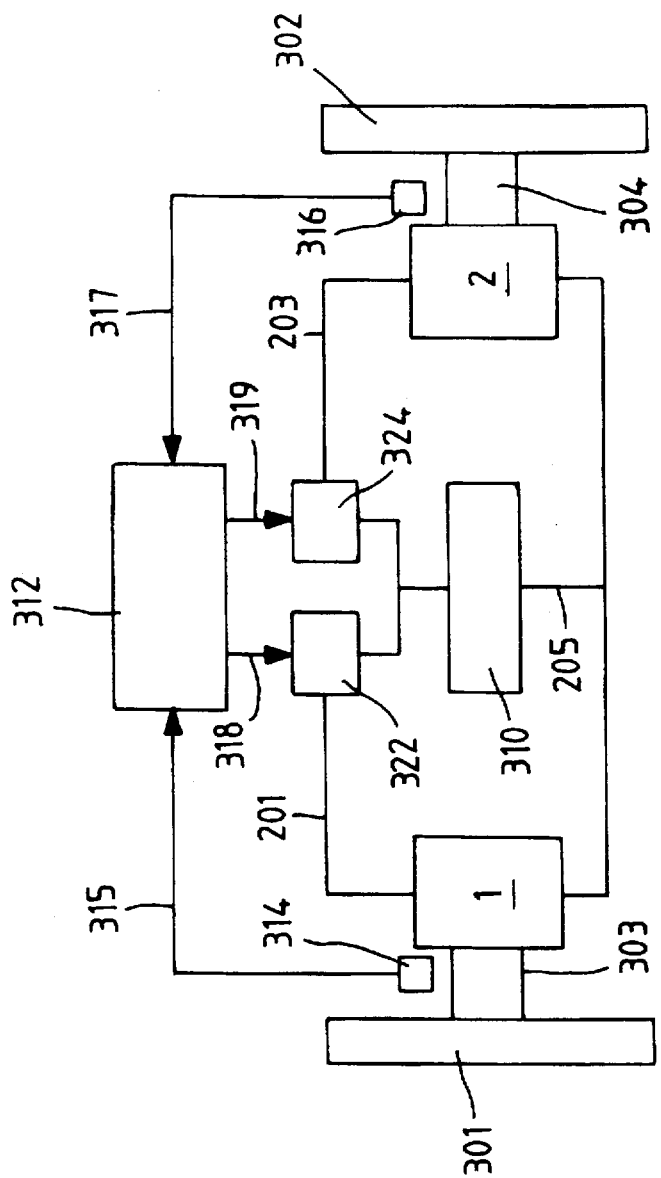
FIG. 4 is a block diagram showing overall operation of the anti-spin system.

The diagram of FIG. 4 summaries the operation of the anti-spin device. The diagram shows the motors 1 and 2 to which wheels 301 and 302 are coupled at 303 and 304, e.g. by the coupling flanges 14 and 114. A source of fluid under pressure 310 is connected to the external ducts 201 and 203 respectively specific to the motors 1 and 2 and to the external duct 205 that is common to both motors. Wheel speed measuring devices 314 and 316 are placed in the proximity of the wheels 301 and 302 respectively. The magnitudes measured by these devices 314 and 316 are transmitted by connections 315 and 317 to a processor module 312. This module compares the magnitudes transmitted thereto with each other and possibly also compares them with a reference magnitude.

The anti-spin valves 322 and 324 are connected to the output of the processor module 312 via respective connections 318 and 319. These valves 322 and 324 are placed respectively in the external duct 201 and in the external duct 203. If the speed of the first motor is judged to be excessive, the processor module issues a correction signal which actuates the control means of the anti-spin valve 322, in such a manner as to reduce the fluid flow rate along external duct 201 which is in turn connected to the first upstream duct 200. Thus, if the bridge is operating at large cylinder capacity, the fluid flow rate through the first and second main ducts 142 and 152 is restricted so that the speed of the wheel 301 is reduced. If the bridge is operating at small cylinder capacity, the fluid flow rate in the first main duct 142 is restricted such that the speed of the wheel 302 is likewise reduced.

Similarly, the anti-spin valve 324 serves to restrict the fluid flow rate along the external duct 203 if a correction signal is issued.

Figure 5:
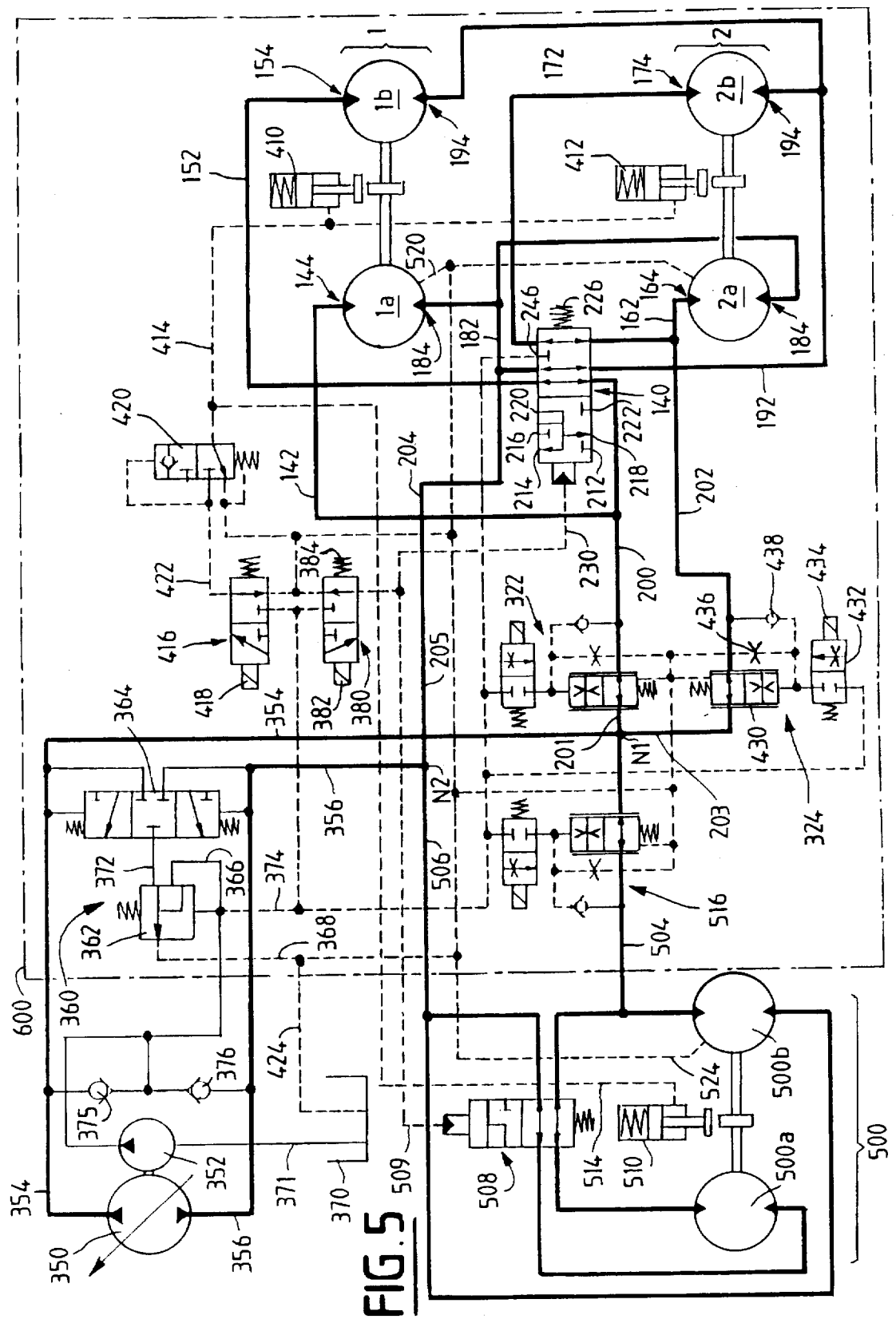
FIG. 5 shows the entire hydraulic circuit including the hydrostatic bridge and a third motor.

There follows a general description of the pressurized fluid circuit including both motors of the bridge, given with reference to FIG. 5. For the sake of clarity, insofar as the motors have two operating cylinder capacities, each of them is shown in the form of two hydraulic entities 1a, 1b, and 2a, 2b, each of which corresponds to half its cylinder capacity.

The source of fluid under pressure is a main pump 350 which is reversible, i.e. capable of operating in both directions of fluid flow. Two ducts 354 and 356 are connected to the pump 350. The duct 354 divides at a node N1 into external ducts 201 and 203 which have the anti-spin valves disposed therein, respectively for the first motor 1 and for the second motor 2. The duct 356 is connected to external duct 205 which is itself connected to both motors 1 and 2.

Figure 2:
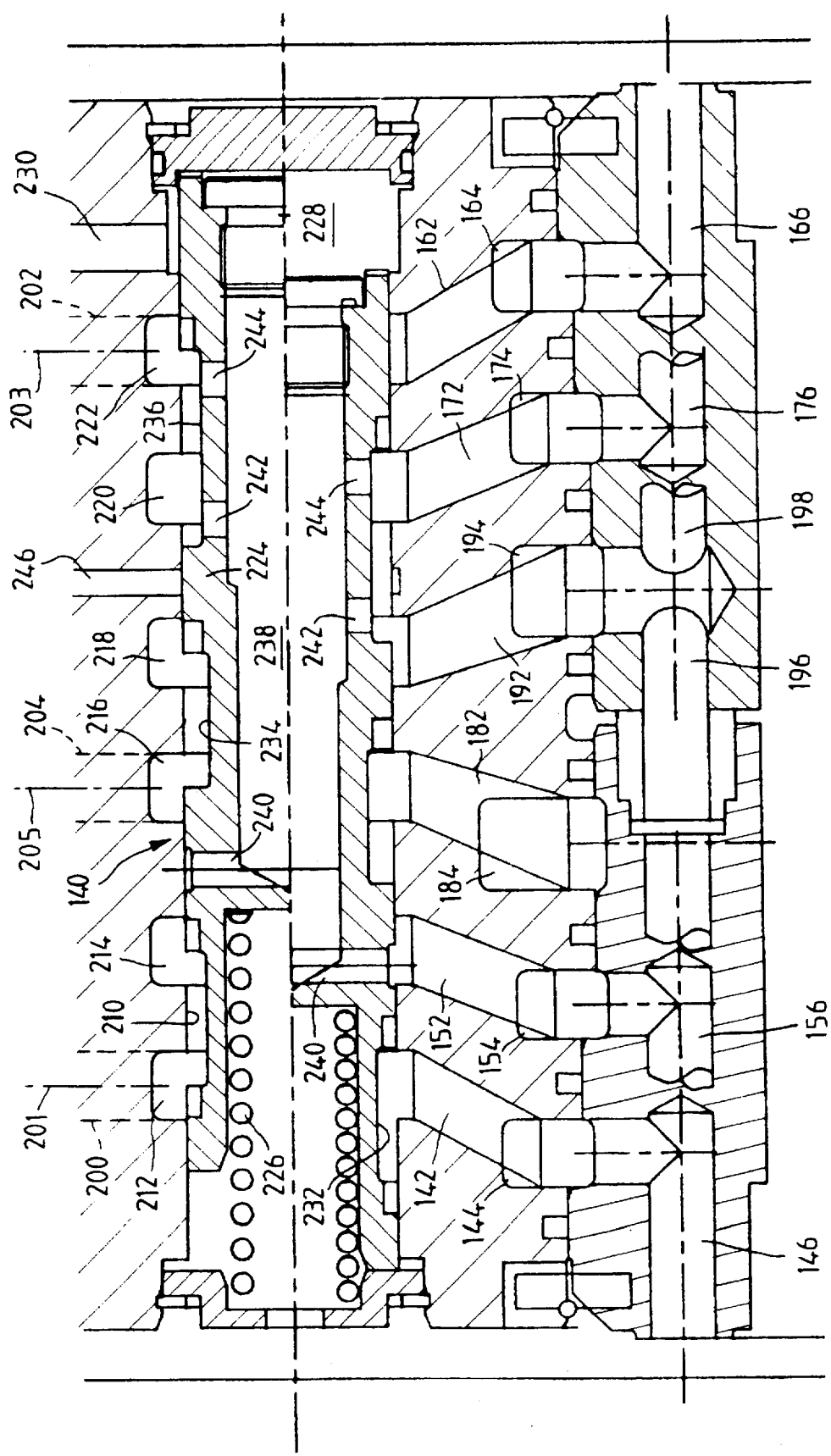
FIG. 2 is a detail view, likewise in axial section, showing the operation of the cylinder capacity selection device.

To facilitate understanding, the ducts and grooves that have already been described with reference to FIGS. 1 and 2 are given the same references in FIG. 5, wherever possible.

The overall casing includes at least one auxiliary duct which serves to control a special function and is suitable for being connected to an auxiliary fluid source. This auxiliary fluid source can be independent from the main fluid source, and it may be constituted by a second reversible pump which operates independently of the first pump 350. The auxiliary source may also be connected to the main fluid source via a shuttle slide suitable for taking up at least one position in which said auxiliary fluid source is indeed connected to the main fluid source.

This applies to the example shown in FIG. 5 where an auxiliary circuit is fed from a booster pump 352 via an exchange/booster unit 360. This unit includes a valve 362 directly connected to the booster pump 352 and a selector or shuttle slide 364. In this figure, the main circuit fed by the main pump 350 is drawn in bold continuous lines, the auxiliary circuit is drawn in fine continuous lines, and the auxiliary ducts and also the leakage return ducts are represented by dashed lines.

When the pressure in the ducts 354 and 356 is equal, the fluid pressure generated by the booster pump 352 serves to place the valve 362 in such a manner as to interconnect the ducts 366 and 368, so it serves only to feed the auxiliary circuit with pressure and to exhaust the flow from the auxiliary circuit into the unpressurized tank 370. The booster pump 352 is connected to said tank via a suction duct 371.

In contrast, when the pressures in the ducts 354 and 356 are different, the shuttle slide 364 takes up a position in which it connects the duct 372 to that one of the ducts 354 and 356 in which the pressure is lower. The position of the valve 362 is then such that the duct 372 is connected to the duct 368 such that the auxiliary circuit is fed with pressure via that one of the ducts 354 and 356 in which the pressure is lower. The pressure in said duct is then compensated by one of two non-return valves 375 and 376 placed at the outlet from the booster pump. The auxiliary circuit is thus fed by the duct 374 and excess flow is exhausted via the duct 368 which is connected to the duct 424 that discharges into the tank 370.

In the example shown, the auxiliary fluid source serves to control three special functions, namely: the function of controlling the cylinder capacity selection device; the function of boosting (i.e. maintaining pressure in) the ducts of the bridge that are not in use during operation at small cylinder capacity; and the function of releasing the brakes of the motors. In addition, and in conventional manner, the auxiliary fluid source serves to boost the main circuit.

Thus, reference 380 designates a valve controlled by a control member 382. In a first position, under drive from a return spring 384, this valve does not put the auxiliary duct 230 which serves to control the cylinder capacity selection device into communication feed duct feed duct 374 of the auxiliary circuit. Consequently, as mentioned above, the cylinder capacity selection slide 224 occupies its first position under drive from its spring 226, and the two motors of the bridge operate at large cylinder capacity. In its second position, the valve 380 under the control of the control means 382 puts the auxiliary selection duct 230 into communication with the feed duct of the auxiliary circuit 374, such that the cylinder capacity selection slide occupies its second position and the motors operate at small cylinder capacity.

The above-mentioned auxiliary duct 246 is a booster duct which is continuously fed by the feed duct 374 of the auxiliary circuit. In the large cylinder capacity position of the cylinder capacity selection device, this auxiliary duct is closed by the wall of the cylinder capacity selection slide 224 and is consequently isolated from all of the main ducts of the circuit. In contrast, in the small cylinder capacity position, the auxiliary booster duct 246 is put into communication with the second and fourth main ducts of the first type and with the second main duct of the second type.

The overall casing also includes an auxiliary duct for releasing the brakes. With reference to FIG. 1, it can be seen that the casing portions 4A and 104A of the motors 1 and 2 have respective brake-release chambers 390 and 392 which can be fed with fluid under pressure, via an auxiliary brake-release duct to inactivate the brake discs 394 and 396 respectively that are normally urged into a braking position by a respective pusher 398 and 400 in turn subjected to thrust by a respective resilient washer 402, 404.

These assemblies comprising brake-release chambers, brake discs, pusher, and return washer are represented diagrammatically in FIG. 5 where they are given respective overall references 410 and 412 for the motors 1 and 2. It should be observed that in the example shown, each of the two motors has its own brake-release chamber, but that it would be possible for only one of them to be equipped with such a chamber.

The auxiliary brake-release duct 414 communicates with the brake-release chamber(s) to supply fluid under pressure thereto in order to move the brake into a release position. The bridge includes a controlled valve 416 suitable for enabling fluid to be fed to the auxiliary brake-release duct 414 to fill the brake-release chamber(s). The valve 416 may therefore be controlled by the control means 418 to connect the auxiliary brake-release duct 414 to the feed duct 374 of the auxiliary circuit.

In the example shown, a quick exhaust valve 420 is also provided connected to the brake-release chamber(s). This quick exhaust valve is situated between the controlled valve 416 and the auxiliary brake-release duct 414. When it is fed by the auxiliary fluid source via the feed duct 374, the controlled valve 416 enables fluid to be fed to the auxiliary brake-release duct. More precisely, the controlled valve urges the quick exhaust valve 420 into a position where the auxiliary duct 414 is indeed connected to the duct 422 leaving the controlled valve and is indeed fed with fluid under pressure via the duct 374. In contrast, when the controlled valve is no longer fed by the auxiliary fluid source, it causes the quick exhaust valve 420 to be opened, i.e. it causes it to occupy a position in which the auxiliary brake-release duct 414 is directly connected to the exhaust duct 424 which discharges fluid into the unpressurized tank 370.

The operation of the anti-spin valves is described below with reference more specifically to the valve 324. This valve 324 includes a first valve 430 interposed on the second upstream duct 202 or on the external duct 203 connected thereto. In a first position, when no spin has been detected, it enables fluid to pass into the second upstream duct 202 without any restriction, whereas in its second position it applies a constriction to the second upstream duct 202, thereby restricting the flow rate of fluid therealong. This first valve 430 is driven by a controlled valve 432 connected to the feed duct of the auxiliary circuit 374 and provided with control means 434.

When the wheel 302 is spinning or when excess speed of the second motor 2 is detected, the control means 434 actuate the valve 432 in such a manner as to cause it to allow fluid delivered by the feed duct 374 of the auxiliary circuit to reach the pilot chamber of the valve 430, thereby placing the constriction of said valve in the upstream duct 202 or the external duct 203. When spinning comes to an end, the valve 432 ceases to feed the pilot chamber of the valve 430, which valve is emptied by a nozzle 434 connected to the duct 424 for exhausting fluid into the unpressurized tank 370. As a result, the first valve 430 returns to its first position and the pressure in the second upstream duct 202 returns to normal (i.e. if the first wheel does not start spinning in turn, to a pressure identical to that in the upstream duct 200). It may also be observed that in order to avoid an excessive pressure drop in the second upstream duct 202, in the event of the second motor being subjected to excess speed (for example because the wheel driven by said second motor happens to be the outside wheel of a vehicle making a tight turn), the outlet of the valve 432 is connected to the second upstream duct 202 via a non-return valve 438 which enables the pilot chamber of the valve 430 to be emptied and to return said valve to its first position, thereby allowing fluid to pass without restriction.

The structure and the operation of the anti-spin valve 322 connected to the first upstream duct are the same as those described above with reference to the valve 324.

The circuit shown in FIG. 5 includes a pressurized fluid assembly that further comprises a third motor 500 in addition to the hydrostatic bridge that includes the motors 1 and 2.

There is no point in showing this third motor in detail, but like the first two motors it comprises the following component elements:

a casing;

a cylinder block mounted to rotate about an axis of rotation relative to a reaction member secured to the casing with respect to rotation about said axis, and including a plurality of radial cylinders suitable for being fed with fluid under pressure;

an internal fluid distributor secured to the casing with respect to rotation and having a distribution face, said distributor including distribution ducts that open out into said distribution face to be put into communication with the cylinders; and at least one duct for feeding the cylinders with fluid and at least one duct for exhausting fluid from the cylinders, and suitable for communicating with the distribution ducts.

By way of example, the first and second motors may be fitted to the two independent back wheels of a vehicle while the third motor is fitted to the front wheel(s) of the vehicle. In the example shown, the third motor has two cylinder capacities, which is why it is represented diagrammatically as two hydraulic entities 500a and 500b, each corresponding to half its cylinder capacity. The references 504 and 506 of FIG. 5 designate respectively the feed duct and the exhaust duct of the third motor. The duct 504 is connected to the node N1 from which the duct 354 extends to the external ducts 201 and 203 which are themselves respectively connected to the first and second upstream ducts 200 and 202 of the hydrostatic bridge. These first and second upstream ducts are thus in communication with the duct 504. This duct is therefore of the same type as the main ducts of the first type in the bridge.

In contrast, the duct 506 is connected via the node N2 to the duct 356 of the main fluid source, which node is also connected to the external duct 205 which is itself connected to the third upstream duct 204 of the hydrostatic bridge. Thus, fluid feed and exhaust are provided to the third motor in the same manner as to the motors 1 and 2 of the bridge.

The cylinder capacity of the third motor is selected by a selector device 508. The device has a slide suitable for taking up a first position for a large cylinder capacity in which both cylinder capacity halves 500a and 500b are indeed fed with fluid under pressure, and a second position for small cylinder capacity in which only cylinder capacity half 500a is fed while the other cylinder capacity half 500b is put into a closed loop. The device 508 for selecting the cylinder capacity of the third motor is actuated by the auxiliary duct 509 via the valve 380 which, as mentioned above, also actuates the device 140 for selecting the cylinder capacity of the motors 1 and 2.

The third motor also includes a braking system 510 that includes its own brake-release chamber and that operates in the same manner as the above-described systems 410 and 412. Thus, via an auxiliary brake-release duct 514, the system 510 is connected to the duct 414 and is also under the control of the brake-release valve 416 and of the quick exhaust valve 420 enabling the break-release camber to be fed or emptied.

Like the first two motors, the third motor also includes an anti-spin device which comprises means for measuring its speed of rotation and for transmitting a correction signal whenever said speed becomes excessive, and an anti-skid valve suitable for reducing the flow rate of fluid in one of the feed and exhaust ducts 504 or 506 of the third motor, as a function of said correction signal.

The anti-spin valve 516 is implemented in a manner analogous to the valves 322 and 324 as described above. It is disposed in such a manner as to be capable of reducing the fluid pressure in the duct 504 if it is detected that the third motor is spinning. It may be actuated so as to reduce pressure or so as to re-establish normal pressure by means of the auxiliary circuit which includes a feed duct 374 and an emptying duct 424.

As mentioned above, the third motor includes an auxiliary duct 509 for controlling the cylinder capacity selection device 508 and an auxiliary brake-release duct 514. In general, the third motor may include at least one auxiliary duct serving to control a special function of said motor, analogous to an auxiliary duct of the hydrostatic bridge and suitable for being put into communication with an auxiliary duct of said bridge for performing on behalf of said third motor the same function as is performed by the above-mentioned auxiliary duct for the hydrostatic bridge.

It should also be observed that each of the three motors 1, 2, and 500 includes a respective leak return duct 520, 522, and 524, all of which are connected to the drain duct 424 leading to the unpressurized tank 370.

The third motor may be replaced by a unit comprising a plurality of motors, e.g. by a second hydrostatic bridge.

In the example shown, the various controlled valves 380, 416, and 432 are constituted by electrically-controlled valves, with their respective control means being electrical.

In general, the controlled valves may be controlled by means that are electrical, hydraulic, or pneumatic, or by a combination of such means.

The chain-dotted outline 600 in FIG. 5 designates the hydraulic bridge. Apart from the cylinder capacity selection device 140, the various controlled valves for controlling special functions can be integrated in the overall casing or they may be external and fixed directly thereto.

Although the external ducts are external to the overall casing, they constitute a portion of the assembly comprising the hydrostatic bridge and the anti-spin device.

We claim:

1. A hydrostatic bridge comprising an overall casing, two hydraulic motors having two distinct operating cylinder capacities, and a device for simultaneously selecting the cylinder capacities of said motors, each motor comprising:

a cylinder block which is mounted to rotate about an axis of rotation relative to a reaction member secured to the overall casing against rotation about said axis, and including a plurality of radial cylinders suitable for being fed with fluid under pressure, the cylinder block being provided with a communication face perpendicular to the axis of rotation; and an internal fluid distributor secured to the overall casing against rotation and having a distribution face perpendicular to the axis of rotation, and a connection face, said distributor including distribution ducts which open out into said distribution face to be put into communication with the cylinders, said distribution face being suitable for being pressed against the communication face of the cylinder block;

the axis of rotation being common to the two motors;

the connection faces of the distributors of the two motors being situated facing each other, and the distribution faces of said distributors being urged axially against the respective communication faces of the cylinder blocks of the two motors;

the motors including "main" ducts both of a first type and of a second type, said ducts being found in the overall casing, co-operating with the device for selecting the cylinder capacity of the motors, and being suitable for communicating with the distribution ducts, the main ducts of the first type belonging to one of two groups constituted by cylinder feed ducts and ducts for exhausting fluid from the cylinders, and the main ducts of the second type belonging to the other of said two groups;

the bridge including four main ducts of the first type and two main ducts of the second type:

the first and second main ducts of the first type being connected via respective first and second grooves to respective first and second groups of distribution ducts of the first motor;

the third and fourth main ducts of the first type being connected via respective third and fourth grooves to respective first and second groups of distribution ducts of the second motor;

the first main duct of the second type being connected via a fifth groove to a third group of distribution ducts of the first motor and to a third group of distribution ducts of the second motor, the ducts of the third group of distribution ducts of the first and second motors being hydraulically connected via the connection faces of the distributors of said motors; and the second main duct of the second type being connected via a sixth groove to a fourth group of distribution ducts of the first motor and to a fourth group of distribution ducts of the second motor, the ducts of the fourth groups of distribution ducts of the first and second motors being hydraulically connected via the connection faces of the distributors of said motors; and wherein the overall casing includes first, second, and third upstream ducts suitable for being connected to a main fluid source via a fluid circuit, the cylinder capacity selection device having a "large cylinder capacity" first position in which the first, second, and third upstream ducts are connected respectively to the first and second main ducts of the first type, to the third and fourth main ducts of the first type, and to the first and second main ducts of the second type, and a "small cylinder capacity" second position in which the first, second, and third upstream ducts are connected respectively to the first main duct of the first type, to the third main duct of the first type, and to the first main duct of the second type, the second and fourth main ducts of the second type communicating, in said second position, with each other and with the second main duct of the second type; and wherein the bridge includes an anti-spin device which comprises means for measuring the speed of rotation of each motor and for transmitting correction signals as soon as the speed of rotation of one of the motors becomes excessive, a first anti-spin valve suitable for reducing the fluid flow rate in the first upstream duct as a function of the correction signal relating to the first motor, and a second anti-spin valve suitable for reducing the fluid flow rate in the second upstream duct as a function of a correction signal relating to the second motor.

2. A hydrostatic bridge according to claim 1, wherein the overall casing includes at least one auxiliary duct which serves to control a special function and which is suitable for being connected to an auxiliary fluid source.

3. A hydrostatic bridge according to claim 2, wherein the auxiliary duct is suitable for being connected to said auxiliary fluid source independent from the main fluid source.

4. A hydrostatic bridge according to claim 2, wherein the auxiliary duct is suitable for being connected to said auxiliary fluid source connected to the main fluid source via a shuttle slide suitable for adopting at least one position in which the auxiliary fluid source is indeed connected to the main fluid source.

5. A hydrostatic bridge according to claim 2, wherein the overall casing includes a "selection" first auxiliary duct, and wherein the bridge includes a controlled valve suitable for enabling the selection auxiliary duct to be fed with fluid to control the cylinder capacity selection device.

6. A hydrostatic bridge according to claim 5, wherein the controlled valve is an electrically controlled valve.

7. A hydrostatic bridge according to claim 2, wherein the overall casing includes a "brake-release" third auxiliary duct which communicates with at least one brake-release chamber suitable for being filled with fluid under pressure to urge a brake into a brake-release position, and wherein the bridge includes a controlled valve suitable for enabling the brake-release auxiliary duct to be fed with fluid so as to fill the brake-release chamber.

8. A hydrostatic bridge according to claim 7, including a quick exhaust valve connected to the brake-release chamber, the controlled valve enabling the auxiliary brake-release duct to be fed with fluid when it is itself fed from the auxiliary fluid source, and causing the quick exhaust valve to be opened when it is not fed by said source.

9. A hydrostatic bridge according to claim 2, wherein the overall casing includes a "booster" second auxiliary duct which, in the large cylinder capacity position of the cylinder capacity selection device is isolated from any of the main ducts and which, in the small cylinder capacity position of said device, is in communication with the second and fourth main ducts of the first type and with the second main duct of the second type.

10. A pressurized fluid assembly comprising a hydrostatic bridge according to claim 1, and further including a third hydraulic motor comprising:

a casing;

a cylinder block which is mounted to rotate about an axis of rotation relative to a reaction member secured to the casing with respect to rotation about said axis, and which includes a plurality of radial cylinders suitable for being fed with fluid under pressure;

an internal fluid distributor secured to the casing with respect to rotation and having a distribution face, said distributor including distribution ducts that open out into said distribution face to be put into communication with the cylinders;

at least one duct for feeding the cylinders with fluid and at least one duct for exhausting fluid from the cylinders, said ducts being suitable for communicating with the distribution ducts;

wherein the first and second upstream ducts together, and the third upstream duct on its own, are respectively suitable for being put into communication with one and the other of said feed and exhaust ducts; and wherein the third motor includes an anti-spin device which comprises means for measuring the speed of rotation of the third motor and for transmitting a correction signal as soon as said speed becomes excessive, and a third anti-spin valve suitable for reducing the fluid flow rate in one of the fluid feed and exhaust ducts of the third motor as a function of said correction signal.

11. An assembly according to claim 10, wherein the overall casing of the hydrostatic bridge includes at least one auxiliary duct which serves to control a special function and which is suitable for being connected to an auxiliary fluid source, and wherein the third motor has at least one auxiliary duct serving to control a special function of said third motor analogous to the auxiliary duct of the bridge and suitable for being put into communication with the auxiliary duct of said bridge to perform the same function for said third motor as the function performed by said auxiliary duct for the bridge.

* * * * *